(12) United States Patent
Woolever

(10) Patent No.: US 8,920,078 B2
(45) Date of Patent: Dec. 30, 2014

(54) BLOWER CONTROLLER FOR PNEUMATIC CONVEYANCE OF GRANULAR MATERIALS

(75) Inventor: Jason A. Woolever, Rochester, IN (US)

(73) Assignee: Jason Woolever, Rochester, IN (US)

( * ) Notice: Subject to any disclaimer, the term of this patent is extended or adjusted under 35 U.S.C. 154(b) by 677 days.

(21) Appl. No.: 12/793,161

(22) Filed: Jun. 3, 2010

(65) Prior Publication Data

US 2011/0299943 A1 Dec. 8, 2011

(51) Int. Cl.
*B65G 53/66* (2006.01)

(52) U.S. Cl.
CPC ........................... *B65G 53/66* (2013.01)
USPC ............................................................ 406/14

(58) Field of Classification Search
USPC ................................................ 406/12, 14, 16
See application file for complete search history.

(56) References Cited

U.S. PATENT DOCUMENTS

| | | | | |
|---|---|---|---|---|
| 2,622,341 A | * | 12/1952 | Finnegan | 34/591 |
| 2,688,517 A | * | 9/1954 | Riordan | 406/3 |
| 3,178,234 A | * | 4/1965 | Schulte et al. | 266/47 |
| 4,463,504 A | * | 8/1984 | Applegate | 34/175 |
| 4,538,364 A | * | 9/1985 | Jensen | 34/233 |
| 5,189,965 A | * | 3/1993 | Hobbs et al. | 111/178 |
| 6,089,795 A | * | 7/2000 | Booth | 406/43 |
| 6,092,747 A | * | 7/2000 | Gerber et al. | 241/47 |
| 6,584,920 B1 | * | 7/2003 | Cresswell | 111/174 |
| 6,964,543 B2 | * | 11/2005 | Gerber | 406/14 |
| 7,101,120 B2 | * | 9/2006 | Jurkovich | 406/12 |
| 7,114,889 B2 | * | 10/2006 | Kanou et al. | 406/14 |
| 7,950,879 B2 | * | 5/2011 | Hoganson et al. | 406/12 |

* cited by examiner

*Primary Examiner* — William R Harp
(74) *Attorney, Agent, or Firm* — Overhauser Law Offices LLC

(57) ABSTRACT

A system provides pneumatic conveyance of grain or other dry, loose commodities. The system conveys the commodity from a first piece of equipment, for example a grain dryer, to a second piece of equipment, for example, a grain bin. A variable speed blower motor is mounted to drive air through a transport pipe, and the blower motor speed is controlled by a processor and software providing a desired pressure to efficiently move the commodity based on the rate of discharge into the transport pipe, while minimizing wasted energy or damage to the commodity that is often experienced when more than the required pressure is provided by a blower motor. Parameters used in determining the blower motor speed may include the gauge pressure measured in the transport pipe, the rate of discharge of commodity into the transport pipe, and the blower motor current or power.

20 Claims, 8 Drawing Sheets

BLOWER CONTROLLER FOR PNEUMATIC CONVEYANCE OF GRANULAR MATERIALS

BACKGROUND

The present disclosure relates to conveyance control systems, and particularly to a controller for pneumatic conveyance of dry granular materials.

Dry, loose, granular materials, sometimes referred to as dry bulk materials, and referred to herein as 'dry commodities' or 'commodities', include materials such as grain, shredded or chopped vegetation, plastic pellets, and dry chemical, food, or other pellets, flakes, and powders. Commodities are often moved between storage, processing, and transport equipment using a pneumatic conveyance system.

Pneumatic conveyance systems for handling grain after it is harvested is an example of such systems. There are different types of grain dryers, but one typical design includes one or more heated grain columns in which grain is feed into the top and is exposed to heat as it slowly flows downward in the vertical column. The discharged at the bottom of the column is generally rate controlled to provide the desired level of drying, resulting in a desired moisture content of the grain. For example, a metering roll is generally used to control the release of the grain out of the bottom of the drying column. The grain released by the metering roll then generally drops into and is carried away by a discharge auger.

Such dryers are generally controlled by a PLC or other control device that monitors temperatures of the heating plenum and grain, and that controls the burners, metering rolls, and auger accordingly to provide a preset moisture content of grain being discharged. A metering roll speed signal is also generally provided by such a dryer control device. The signal is proportional to the rate of discharge of the grain from a grain drying column. For example, if the grain is too wet, a slower discharge speed will be used and allow more time for drying. As the grain is dried, the discharge speed will be increased, and will typically continue to vary. Such changes in speed are reflected in the discharge speed signal, which may be, for example, an analog signal varying between 0 to 10 volts.

In many systems, the discharge auger is connected to a pneumatic conveyance system that is used to transport the grain to other equipment, for example storage or transport bins. Pneumatic conveyance systems move the grain through a pipe under the pressure of air forced through the pipe by a blower fan driven by a motor. A motor driven airlock allows grain to enter the pipes without letting the pressurized airflow escape. Conventional pneumatic conveyance systems used for grain transport typically have 3 to 6 inch pipes and use a single speed blower motors that runs at full speed, for example, 1750 rpm, regardless of how much grain is introduced into the system. Because of the single speed, a vent in the system is used to bleed off excess air flow/pressure to the atmosphere.

If more pressure than is needed is provided to the pipes, the air wasted by venting off the excess represents higher than required energy costs. Additionally, if commodity is driven to too high a velocity, damage to the commodity can result, especially at bends in pipes or upon transfer into a transport vehicle, lower the value and/or usefulness of the commodity.

SUMMARY

The present invention may comprise one or more of the features recited in the attached claims, and/or one or more of the following features and combinations thereof.

A system for pneumatic conveyance of granular materials from a first piece of equipment to a second piece of equipment includes at least one transport pipe, a blower motor mounted to drive air through the at least one transport pipe, a variable speed motor drive electrically coupled to power the blower motor, a pressure transducer for providing a pressure signal proportional to the pressure in the at least one transport pipe, and a processor, the processor having an input port for receiving the pressure signal, and software adapted to enable the processor to provide a control signal to the variable speed motor drive based at least in part on the magnitude of the pressure signal and a target pressure in the at least one transport pipe, and to active an airlock associated with the at least one transport pipe. The control signal may be determined by the software and controller based at least in part on a form of PID control model.

The processor may include an input port for receiving a discharge speed signal relating to the rate at which the material is discharged into the at least one transport pipes, the software may be adapted to determine the control signal based at least in part on the discharge speed signal. The control signal may be determined by the software and controller based at least in part of a form of feedforward type control model in which the feedforward signal is at least in part based on the discharge speed signal. The control signal may be determined by the software and controller based at least in part of a form of combined PID and feedforward type control model in which the feedforward signal is at least in part based on the discharge speed signal. The discharge speed signal may be provided by a controller associated with the first piece of equipment. The first piece of equipment may include a grain dryer.

The software may include a base speed associated with the blower motor, and be adapted to limit the control signal to drive the motor at a minimum of the base speed, the base speed being the lowest speed at which the blower motor can be operated for an extended period without overheating. The software may include a starting set point, and be adapted to initially ramp the control signal over time at least in part based on the starting set point.

The software may include an upper pressure limit and upper time limit, and be adapted to disable the blower motor and the first piece of equipment if the pressure signal exceeds the upper pressure limit for at least the upper time limit. The software may include a lower pressure limit and lower time limit, and be adapted to disable the blower motor, airlock motor, and the first piece of equipment if the pressure signal recedes below the lower pressure limit for at least the lower time limit. Additionally, the software may be adapted to disable the blower motor, airlock motor, and the first piece of equipment upon detection of an over current or over power condition for the blower motor.

The system may include a first relay controlled by the processor and providing the disabling of the blower motor. The system may include a second relay controlled by the processor and providing the disabling of the first piece of equipment. The system may include a graphical user interface coupled to the processor and providing initiation, termination, and setting of parameters associated with the software and controller.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
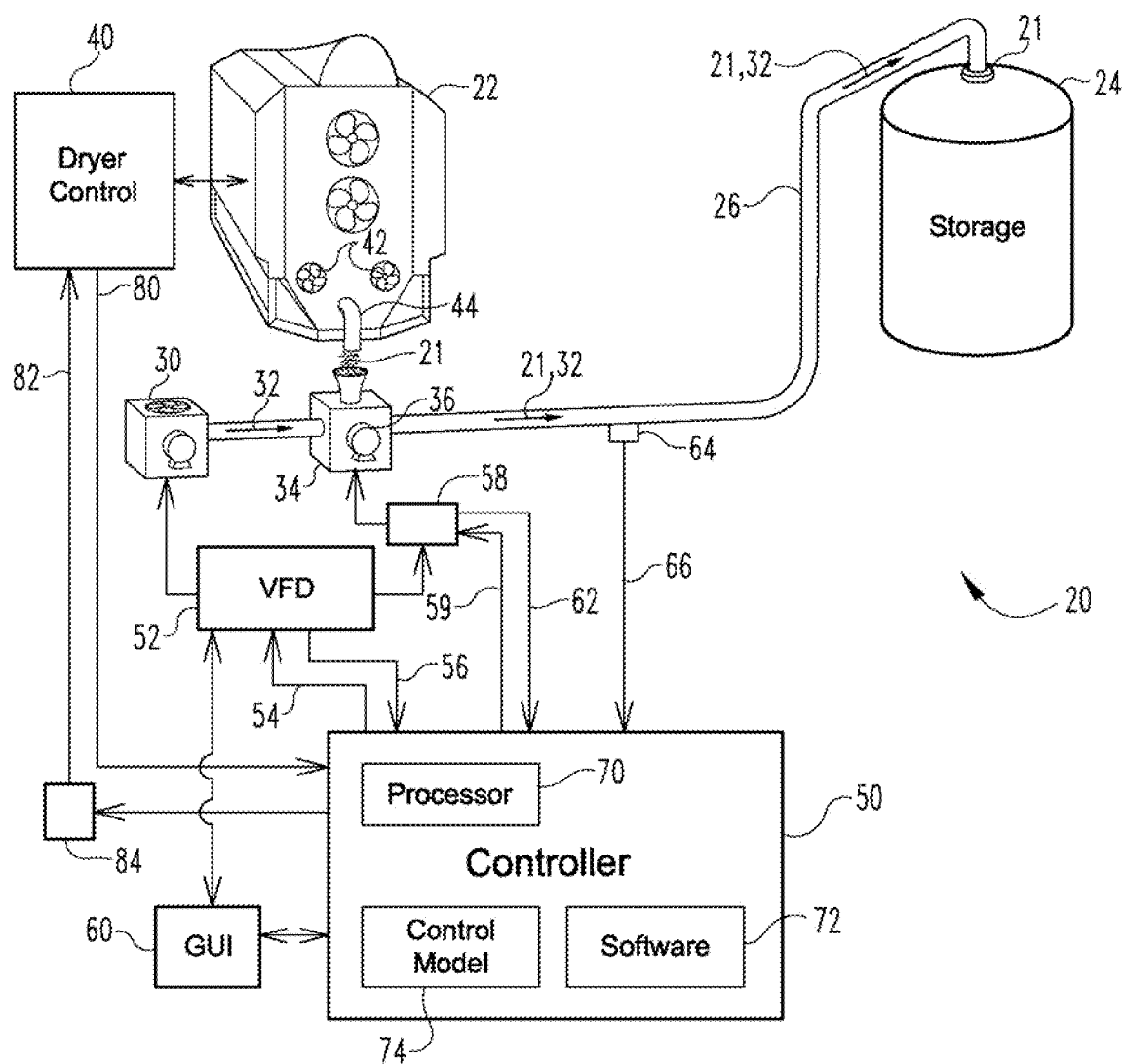
FIG. 1 is a schematic block diagram of an illustrative embodiment of the blower controller and associated pneumatic conveyance system and commodity equipment.

For the purposes of promoting and understanding the principals of the invention, reference will now be made to one or more illustrative embodiments illustrated in the drawings and specific language will be used to describe the same.

Referring to FIG. 1, a first illustrative embodiment of a pneumatic conveyance system 20 and associated equipment according to the present disclosure is shown. The system 20 can be used for the transport of a commodity 21, for example from a first piece of equipment such as a grain dryer 22, to a second piece of equipment, such as a grain bin 24. The system 20 includes at least one transport pipe 26, which is typically 3-6 inches in diameter for agricultural applications such as the conveyance of harvested grain, but could comprise any conduit through which a commodity can be transported by the force of air or another fluid.

A blower motor 30 operates to drive pressurized air 32 through the transport pipe 26 and in the direction of desired flow of the commodity. For example, the blower motor 30 can be mounted to one end of the transport pipe 26. An airlock 34 includes a motor 36 that drives a mechanism (not shown) that allows grain 21 to enter the transport pipe 26, but prevents pressurized air 32 from escaping to the atmosphere. The pressurized air 32 in the transport pipe 26 then forces the commodity 21 toward the opposite end of the pipe where it is discharged, for example, into a storage bin 24.

The rate at which the commodity 21 is discharged from the grain dryer 22 and enters the airlock 34 and transport pipe 26 can vary, sometimes significantly. The rate of flow of the commodity 21 through the dryer 22 varies depending upon the initial moisture content of the commodity 21, the desired moisture content upon discharge, and the speed of the drying process. A dryer controller 40, for example a PLC, associated with the grain dryer 22 monitors various parameters and controls the speed at which the commodity 21 transits the dryer 22 by controlling the rate of discharge. For example, metering rolls 42 are generally used to control the release of the commodity 21 out of the bottom of the dryer 22. The commodity 21 released by the metering roll then generally drops into and is carried away by a discharge auger 44, which in this case, directs the commodity 21 into the airlock 32 of the pneumatic conveyance system 20.

For example, if the commodity 21 is relatively wet, or a lower moisture content is set on the dryer controller 40, the metering rolls 42 will be driven at a slower speed, discharging the commodity 21 at a slower rating and allowing more transit time in the dryer 22 for drying. If the commodity 21 is relatively dry, or higher moisture content is set on the dryer controller 40, the metering rolls 42 will be driven at a higher speed, discharging the commodity 21 at a higher rating and allowing less transit time in the dryer 22 for drying. It is not uncommon for the amount of moisture content of a commodity 21 to vary within a particular batch being processed, thus, the rate of discharge of commodity 21 can vary regardless of the settings selected on the dryer controller 40.

Such variations in the rate commodity 21 is introduced into the pneumatic conveyance system 20 for transport make it very desirable to provide variability in the pressure of pressurized air 32 in the transport pipe 26. Specifically, it is advantage for energy conservation and minimizing damage to the commodity 21 that blower motor 30 is set at only the speed required to generate the level of pressurized air 32 required to carry the instant volume of commodity 21 in transport 26 for any moment of time.

Advantageously, the illustrative pneumatic conveyance system 20 includes a controller 50 and variable speed motor drive 52, for example a variable frequency drive, electrically coupled to power the blower motor 30 at an efficient speed. The motor drive 52 receives a speed control signal 54 from the controller 50 and also provides a blower motor fault signal 56 to the controller 50. An illustrative controller 50 is a model no. TWDLCAA16DRF or TWDLCAE40DRF available from Schneider Electric, of Palatine, Ill. An illustrative motor drive 52 is model no. ATV61HD22M3X available from Schneider Electric, of Palatine, Ill.

The motor 36 of airlock 34 can be operated by controller 50. For example, contactor 58 can receive an airlock control signal 59 from the controller 50, and the controller 50 can receive an airlock fault signal 62 from the contactor 58 or airlock 34. Additionally, power for the airlock motor 36 can be provided by the variable speed drive 52 and switched by the contactor 58.

To facilitate operation and monitoring, a graphical user interface (GUI) 60, is interfaced with one or both of the controller 50 and the motor drive 52. For example, the GUI 60 can be a touch screen display such as model no. XBTGT2330 or XBTGT5340 available from Schneider Electric, of Palatine, Ill.

A pressure transducer 64, for example, model no. PTD25-10-0015H available from Automation Direct of Cumming, Ga., provides a pressure signal 66 proportional to the level of pressure air 32 in the transport pipe 66. The controller 50 includes a processor 70 and software 72 enabling the processor 70 to receive/convert the pressure signal 66 and to provide the speed control signal 54 to the motor drive 52. For example, the speed control signal 54, and thus the speed of the blower motor 30, can be based at least in part on the magnitude of the pressure signal 66 and a selected target pressure 122 required to transport the commodity 21 along the pipe 26 and into the storage bin 24. The processor 70 may also store different target pressures for each of one of various storage bins 24 that the transport pipes 26 may be connected to or connectable to. Similarly, processor 70 may also store different target pressure 122 for different types of commodities.

Although many different models of control could be utilized, in the illustrative embodiment of the pneumatic conveyance system 20, the required speed of the blower motor 30 and thus the control signal 54 is determined by the software 72 enabled processor 70 based at least in part on a form of PID (proportional, integral, derivative) control model. For example, if a target gauge pressure, for example in the range of 2.5 to 5 PSIG (although other ranges, for example, up to 13 PSIG could be used), is selected via the GUI 60, the controller 50 and motor drive 52 operate the blower motor 30 at a speed providing the target pressure 122 as indicated by pressure transducer 64 and pressure signal 66. If the commodity 21 is discharged into the airlock 34 at a higher rate, the pressure of the pressurized air 32 will tend to increase from the larger volume of commodity causing slowing the flow of air and commodity mix along the pipe 26. As the pressure signal 66 received by the controller 50 increases to reflect this buildup and possible backup of commodity, the speed signal 54 provided by the controller 50 will be increased accordingly to increase the speed of the blower motor 30, thus increasing the volume of flow of commodity 21 in pipe 26, reducing any backup of the commodity, and eventually dropping the gauge pressure of air 32 back to the target pressure 122.

The processor 70 and software 72 of controller 50 utilize a control model 74 to receive inputs and calculate an output for setting the blower motor 30 speed signal 54. While other control models known in the art could be substituted, a generic PID control model is represented by:

$$CO = K_c \left( e + \frac{1}{T_i} \int e \, dt + T_d \frac{d(-PV)}{dt} \right)$$

Where CO is the control output, and, although other parameters can be used, in the illustrative embodiment the speed signal 54, Kc is the proportional gain factor, Ti is the integral time factor, Td is the derivative time factor, PV is the measured process variable, for example a factor of the pressure signal 66 and the rate of discharge of commodity 21, and e is the error=target pressure 122−pressure signal 66.

Tests of the illustrative system 20 noted that control of the blower motor 30 based on the pressure signal 66 alone provides a lagging response to rapid changes in the discharge rate of the commodity 21. Thus, determining the control signal 54 based at least in part on the rate of discharge of commodity 21 into the airlock 34 is advantageous, and can provide sufficient lead or feedforward accommodation to changes in the instantaneous volume of commodity 21 entering the pipe 26. Most commercially available grain dryers 22 and dryer controllers 40 provide a discharge speed signal 80 based on the speed of the metering rolls 42 that control discharge. The discharge speed signal may be, for example, an analog signal varying between 0 to 10 volts, which can be received/converted by controller 50.

The control model 74 may utilize the input of the discharge speed signal 80 in various ways known in the art to more quickly adapt control signal 54 to variations in the rate of discharge of commodity 21 and therefore to the required control signal 54 to maintain the desired target pressure 122. In the illustrative embodiment of control model 74 is was found advantageous to use the discharge speed signal 80 as a feedforward input that overrides or is more heavily weighted in or than the PID or other control based on the pressure signal 66 when the magnitude of the error is high, for example, when the discharge speed of commodity 21 into the airlock 34 is increasing. The PID portion of the control model has been noted to be most effective at slowly decrease the blower motor 30 speed, and thus increasing efficiency, when the discharge speed of the commodity 21, and therefore the discharge speed signal 80, is relatively stable or decreasing. For example, the software 72 can be operative to engage or disengage the PID portion of the control model based on the pressure signal 66 depending on the magnitude of the control error.

Figure 6:
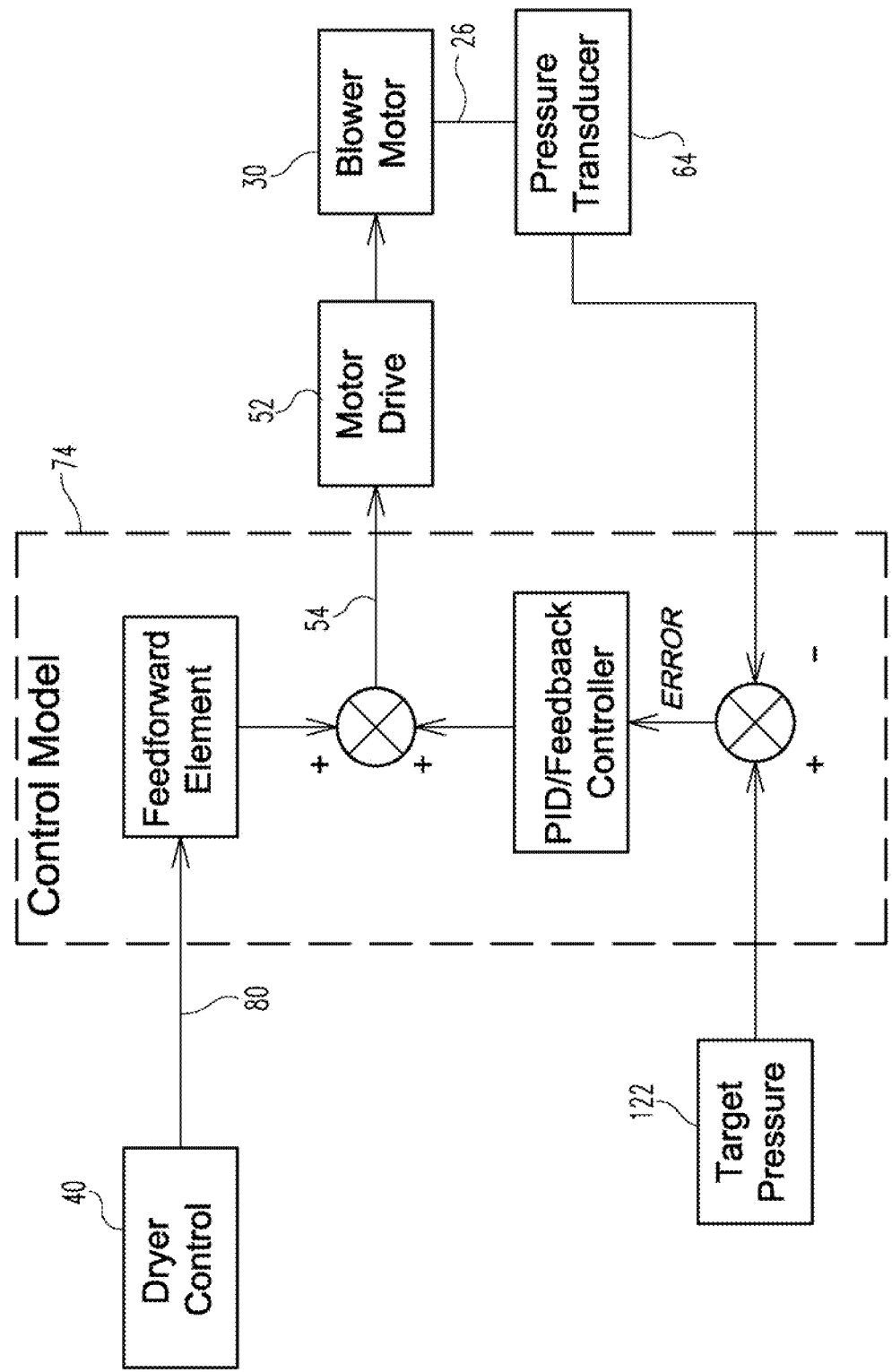
FIG. 6 is an illustrative control model that may be implemented by the software and controller of FIG. 1.

In this way, the system 20 rapidly responds to increases in the rate of discharge of commodity 21 so that the pipes 26 do not become plugged, and the system 20 and less rapidly respond to decreases in the rate of discharge so that energy conservation will be achieved, but not at the cost of commodity plugging the pipes 26. For example, during times of steady or decreasing rates of discharge of commodity 21 into the system 20, the speed signal 54 may be determined by the software 72 and controller 70 implementing the model 74 based at least in part of a form of combined PID and feedforward type control model as illustrated in FIG. 6, in which a product of the discharge speed signal 80 summed with the product of the PID portion of the model to provide the speed signal 54. Alternative control models known in the art that utilize such process inputs may be substituted for the illustrative embodiment shown in FIG. 6. Additionally, because the current and power used by the blower motor 30 will increase with increasing commodity 21 entering the airlock 34 causing increased back pressure against the air flow 32, instead of or in addition to the discharge speed signal 80 and/or pressure signal 66, an alternative embodiment of the system 20 can utilize the current or power used by the blower motor 30 as a process input for determining the speed of the blower motor.

Figure 2:
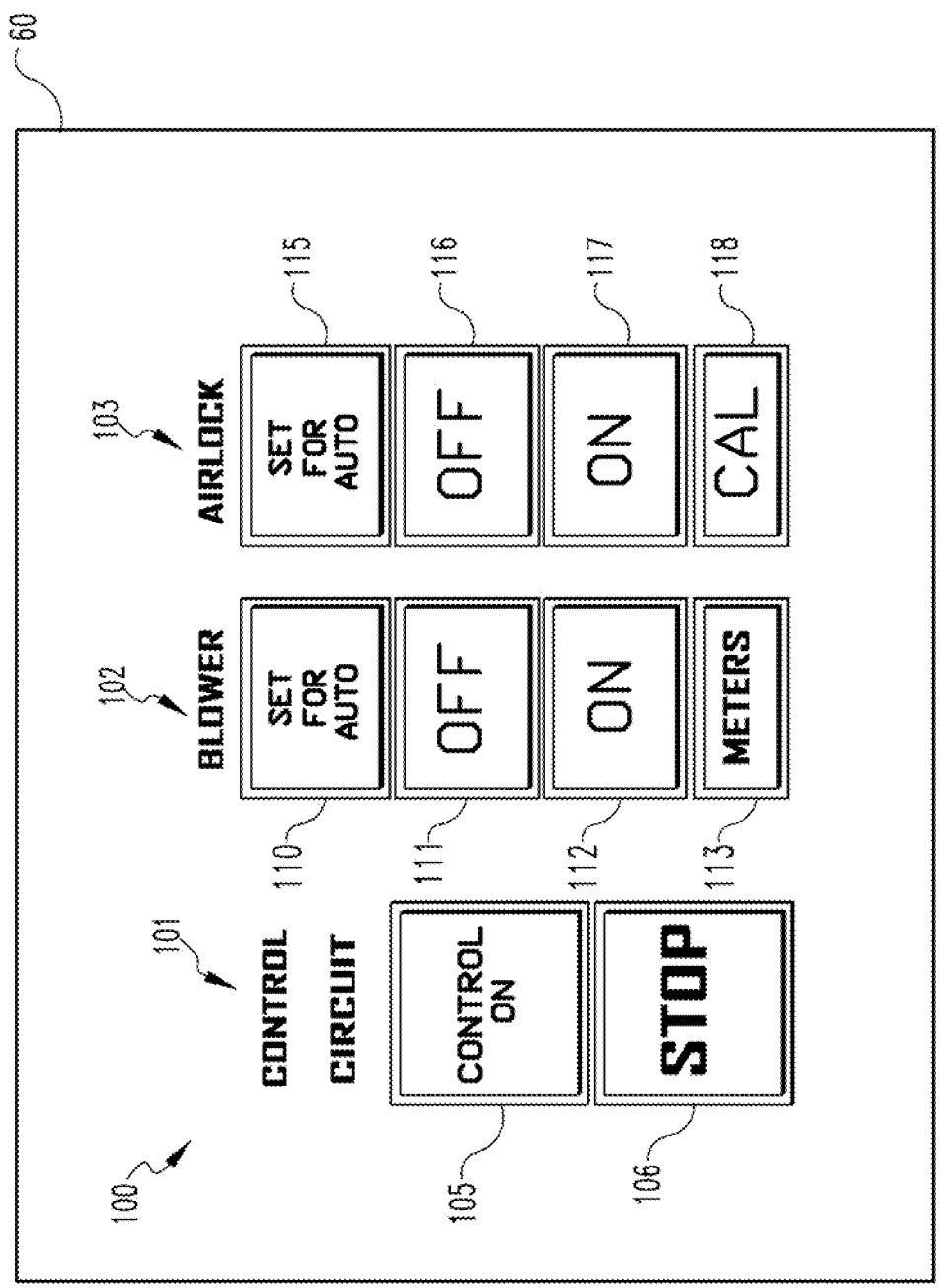
FIG. 2 is an illustrative main screen layout for the GUI of the blower control of FIG. 1.

Referring to FIG. 2, an illustrative main control screen layout 100 is shown on the touch-screen GUI 60. The layout 100 includes a section for each of the main control 101 blower motor control 102 and airlock control 103. The main control 101 includes an activation switch 105 and a stop switch 106. Switches 105 and 106 provide overall on-off control of the pneumatic conveyance system 20 via the controller 50. The blower control section 102 provides an auto selection switch 110 to enable controller 50 to operate the blower motor 30 as required, a manual off switch 111, a manual on switch 112, and a meters switch 113. The airlock section 103 provides an auto selection switch 115 to enable controller 50 to operate the airlock 34 as required, a manual off switch 116, a manual on switch 117, and a calibration switch 118 selects the calibration screen 120 described below.

Figure 3:
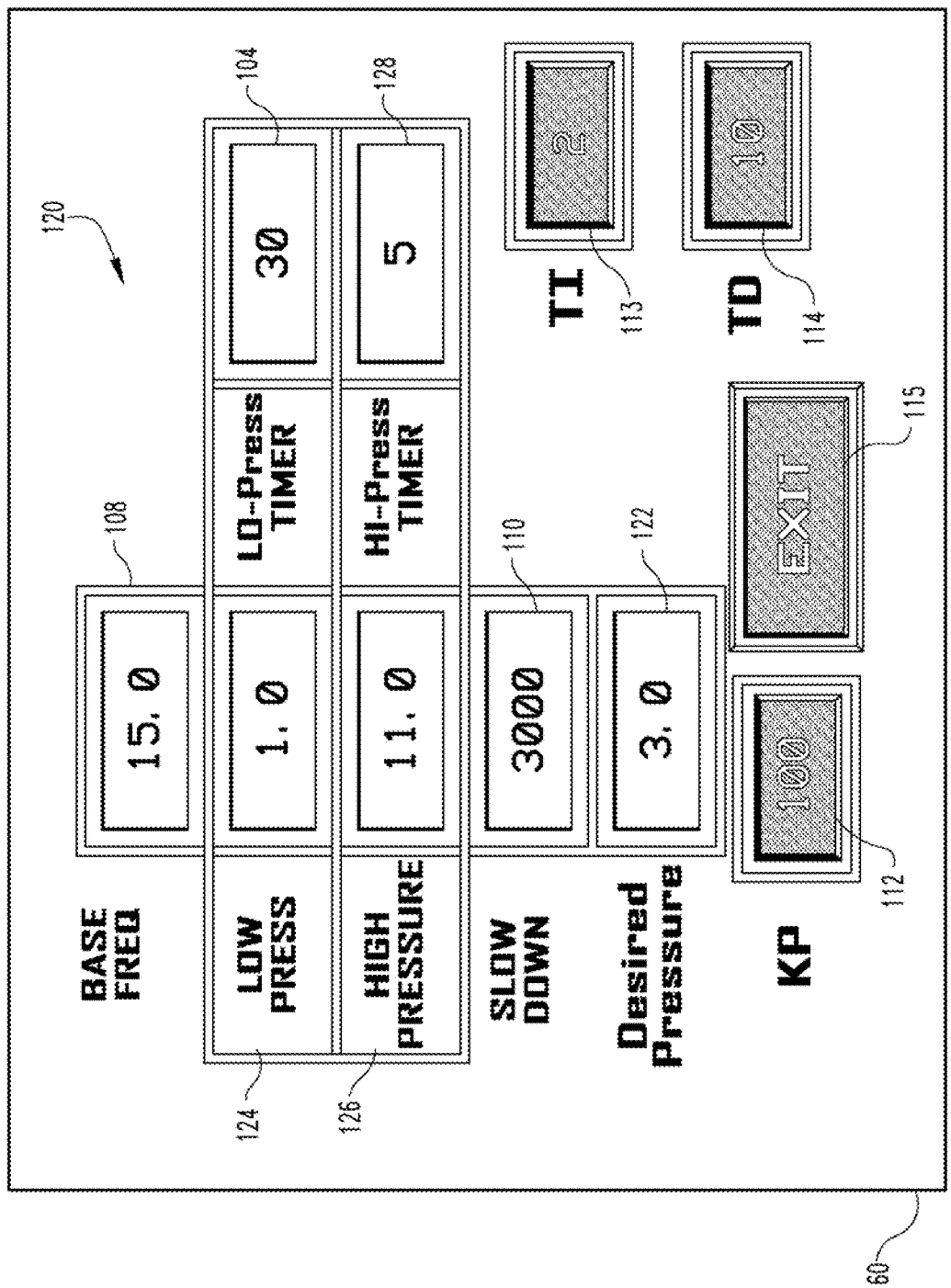
FIG. 3 is an illustrative calibration screen layout for the GUI of the blower control of FIG. 1.

Referring to FIG. 3, an illustrative calibration screen layout 120 is shown on the touch-screen GUI 60. Screen 120 is selected by pressing the calibration switch 118 on the main control screen 100. The calibration screen layout 120 provides for display and selection of various parameters, including some used by the control module 74. In the illustrative system 20, those parameters include the following shown in FIG. 3.

The base frequency 108, for example 15 Hz, is the minimum speed that the blower motor 30 can be operated at for an extended period of time without overheating. The low pressure limit 124 is the lower allowable limit in units of PSIG for the pressurized air 32, for example 2.0 PSIG. A pressure signal 66 below this limit 124 and continuing for the length of low pressure timer 104, for example 30 seconds, will cause a low pressure fault. The high pressure limit 126 is the lower allowable limit in units of PSIG for the pressurized air 32, for example 11.0 PSIG. A pressure signal 66 above this limit 126 and continuing for the length of high pressure timer 128, for example 5 seconds, will cause a high pressure fault. A low or high pressure fault will cause controller 50 to shut down the conveyance system 20 and provide a shut down signal 82 to the dryer controller 40, for example, through relay 84. Similarly, current or power used by blower motor 30 over a limit can similarly cause controller 50 to shut down conveyance system 20 and provide a shut down signal 82 to the dryer controller 40.

The slowdown time 110, for example 3000 units, is related to a rate of deceleration used to stop the blower motor 30 upon detection of a fault or other shutdown. For example, the slowdown time 110 allows for any commodity 21 along the pipe 26 to reach the discharge and at a storage bin 24, and is displayed in hundredths of seconds. The slowdown time 110 also provides a time basis for the controller 50 to reduce the blower motor 30 speed to a more energy efficient level when the discharge rate is steady or decreasing. The desired or target pressure 122 is the selected PSIG pressure found to provide reliable conveyance of commodity 21 for the system 20 while also minimize damage to the commodity. The Kp setting 112, for example 100; Ti setting 113, for example 2; and Td setting 114, for example, 10, are as discussed above for a PID type control model 74. The exit switch 115 will return to the main control layout 100 shown in FIG. 2.

Figure 4:
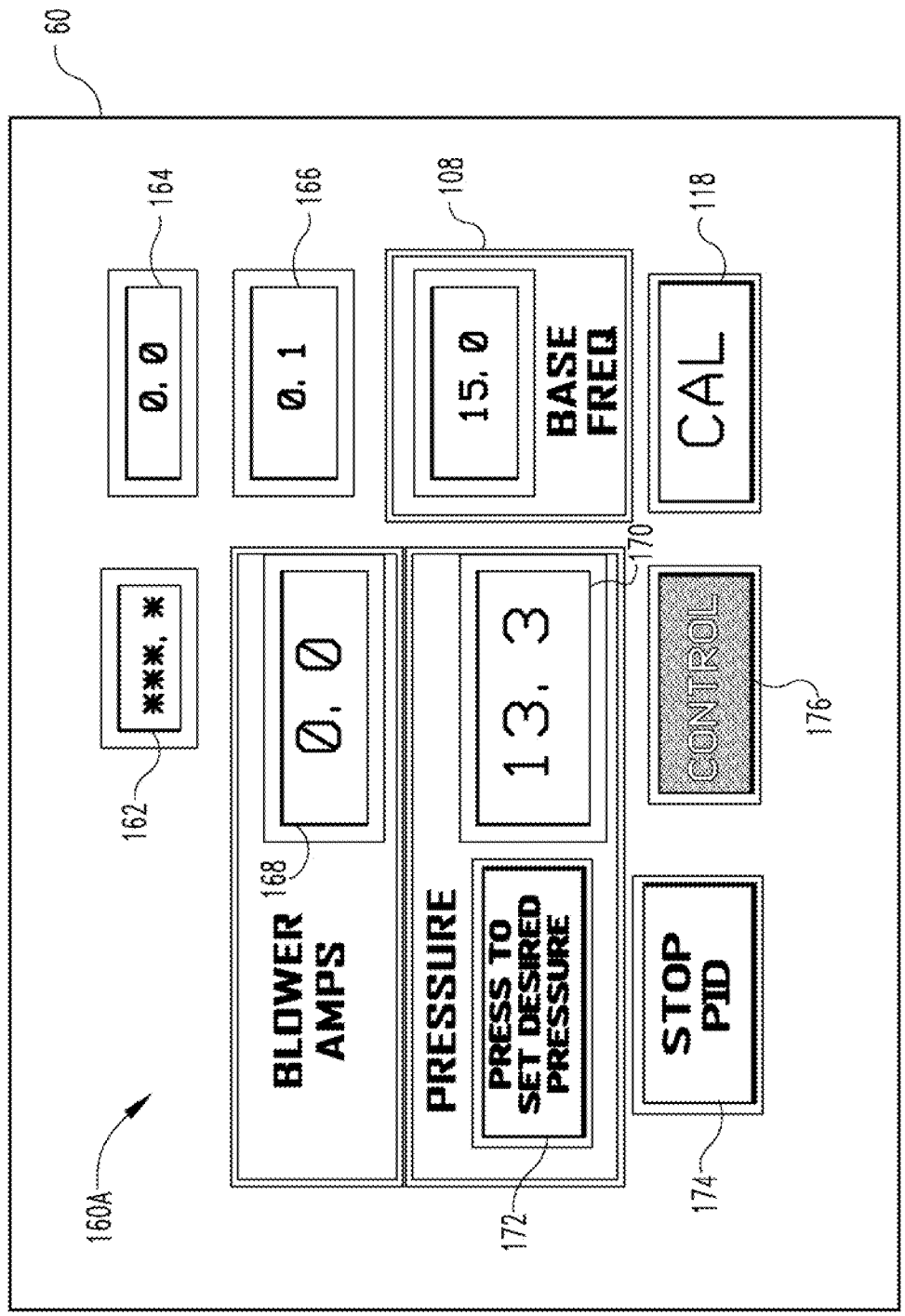
FIG. 4 is an illustrative control screen layout for the GUI of the blower control of FIG. 1.

Referring to FIG. 4, an illustrative control screen layout 160a is shown on GUI 60. The frequency error 162 is a display of the current running conditions. The blower frequency 164 is a display of speed of blower motor 30. The PID output signal 166 is a display of blower speed signal 54 when PID control is active. The calibration switch 118, is also available on control screen 160a and provides selection of the calibration screen 120 shown in FIG. 3.

The minimum base frequency 108 and the supplied current 168 in amps for the blower motor 30 are displayed. The pressure display 170 is the pressure signal 66 displayed in units of PSIG for the pressurized air 32 measured by pressure transducer 64. Set target pressure switch 172 enable resetting of the desire/target pressure 122 used by the controller 50. The PID portion of the control model 74 can be disable using stop PID switch 174. For example, in the illustrative embodiment, when the PID control is disabled, the blower speed signal 54 is determined as a function of the discharge speed signal 80 and the pressure signal 66. Selection of the control switch 176 selects the main control screen 100 shown in FIG. 2.

Figure 5:
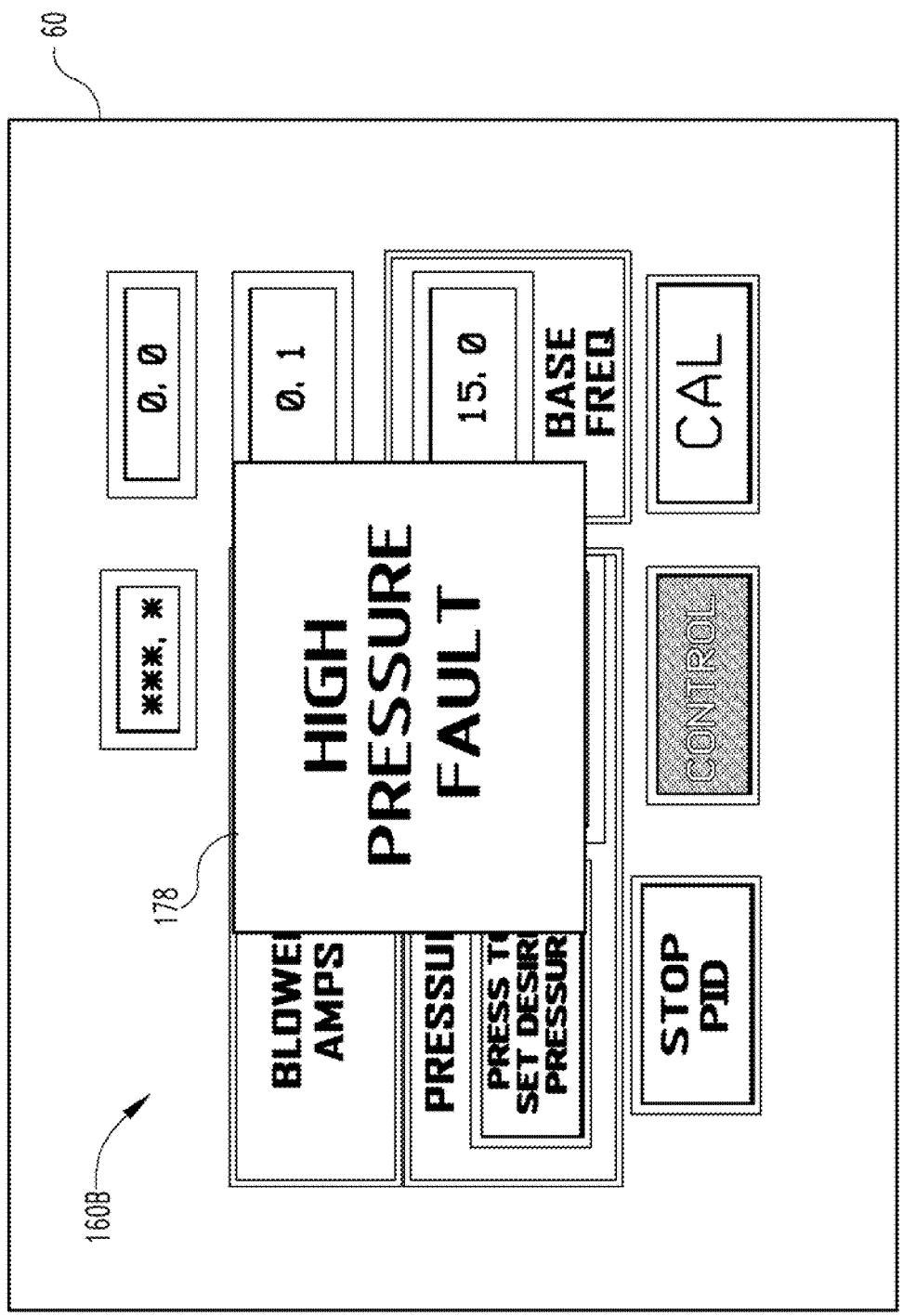
FIG. 5 is an illustrative control screen layout for the GUI of the blower control of FIG. 1 with a fault condition displayed.

Referring to FIG. 5, the control screen layout 160b is shown with a fault message 178 overlaying a portion of the display, in this example a high pressure fault has been detected. For example, when a fault condition initial arises, a yellow warning is displayed, and if the fault condition is not resolved within a specified time limit, a red warning is displayed and the system 20 is safely stopped.

Figure 7A:
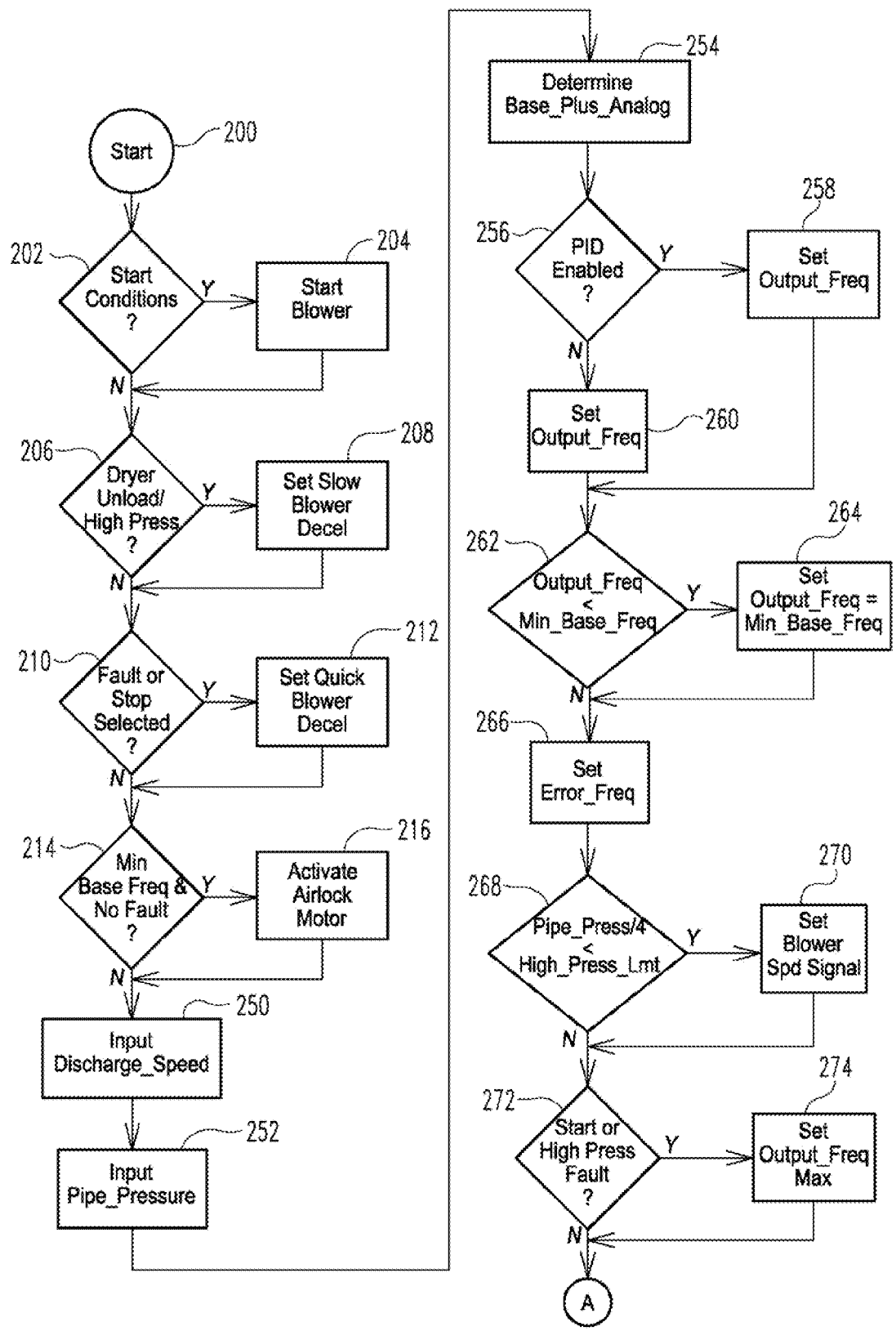
FIGS. 7A and 7B show an illustrative algorithm implemented by the software and controller of FIG. 1.
Figure 7B:
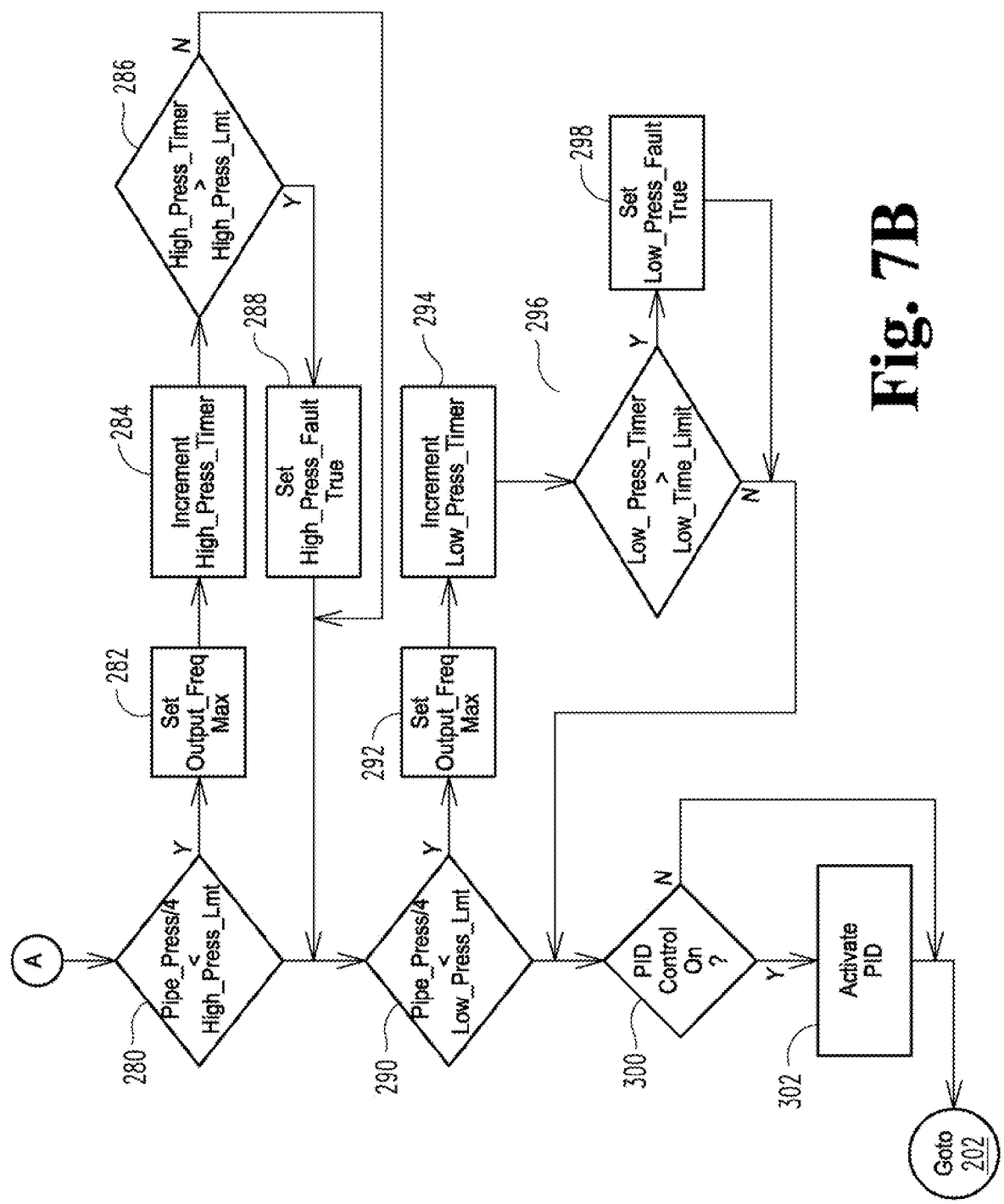

Referring to FIG. 7A-7B, a block diagram shown is an illustrative control algorithm 200 executed by the processor 70, software 72, and control model 74 of controller 50. The algorithm 200 may comprise a subset of the below and other typical control steps known in the art in the below or another order.

At step 202, the processor 70 determines if the requisite conditions to start blower motor 30 are present, for example, power on, control switch 105 selected, stop switch 106 not selected, and no faults set (low/high pressure, blower fault 56, airlock fault 62).

If so, then in step 204, the processor 70 starts the blower motor by providing an initial set point speed, for example a maximum blower speed, for example, a speed control signal 54 providing 60 Hz.

At step 206, the processor 70 determines if a dryer unload fault is received from the dryer controller 40 or a high pressure or other fault, for example high blower motor 30 current, has been set. If so, then in step 208 the processor 70 sets a slow blower deceleration rate to slow the blower motor 30 for system 20 shutdown, and optionally provides shutdown signal 82 (FIG. 2) to stop discharge of commodity 21 from the dryer 22 into the airlock 34.

At step 210, the processor 70 determines if the stop switch 106 has been selected or if another fault condition exists. If so, then at step 212 the processor 70 sets a quick blower deceleration rate to quickly stop the blower motor 30 for system 20 shutdown, and optionally provides shutdown signal 82 (FIG. 2) to stop discharge of commodity 21 from the dryer 22 into the airlock 34.

At step 214, the processor 70 determines whether the blower control signal is at the minimum base frequency and that there is no high pressure fault. If so, then at step 216, the processor provides that airlock signal 59 to activate the airlock 34 and airlock motor 36.

At step 250, the processor 70 inputs and converts, if required, the discharge speed signal 80 provided by the dryer controller 40 (Discharge_Speed).

At step 252, the processor 70 inputs and converts, if required, the pressure signal 66 provided by the pressure transducer 64 (Pipe_Pressure).

At step 254, the processor 70 sets Base_Plus_Analog=Min_Base_Freq.+Discharge_Speed. The Min_Base_Freq. can be the selected minimum operating speed for blower motor 30, for example base frequency 108 in Hertz shown in FIGS. 3 and 4. The Discharge_Speed is the discharge speed signal 80 which relates to the instantaneous volume of commodity 21 being discharged from the dryer 22 into the airlock 34.

At step 256, the processor determines whether PID is enabled. If so, at step 258, the processor 70 sets:
Base_Minus_PID=Min_Base_Freq−PID_Out, where PID_Out is the error between the target pressure 122 and the measured pressure signal 66;
Base_Minus_PID_Plus_Discharge_Speed=Base_Minus_PID+Discharge_Speed; and
Output_Freq=Base_Minus_PID_Plus_Discharge_Speed+Pipe_Pressure, where Pipe_Pressure could be modified by a conversion constant, however, it has been found advantageous to not do so in the illustrative embodiment.

If at step 256 it is determined that the PID is not enabled, for example, by pressing the stop PID switch 174 (FIG. 4) or by conditions under which a more rapid adjustment to the blower motor speed is desired, then at step 260 the processor 70 sets the Output_Freq=Base_Plus_Analog+(Pipe_Pressure/4). Pipe_Pressure/4 is an approximate conversion of the analog pressure signal 66 received from the pressure sensor 64 to units of PSIG. For other pressure sensors 64 the conversion constant will likely vary.

At step 262 the processor 70 determines if the Output_Freq<Min_Base_Freq. If so, then at step 264, the processor 70 sets the Output_Freq=Min_Base_Freq (e.g. 20 Hz).

At step 266 the processor 70 sets Error_Freq=Output_Freq−Freq_Setpoint.

At step 268 the processor 70 determines if the Pipe_Pressure/4<High_Pressure_Limit. If so, then at step 270, the processor 70 sets the blower speed signal 54 (Blower_Freq)=Output_Freq.

At step 272, the processor 70 determines if blower motor 30 start is selected or if the high pressure fault is set. If so, then in step 274, the processor 70 sets Output_Freq=Max_Speed_Freq (e.g. 60 Hz)

At step 280, the processor 70 determines if Pipe_Pressure/4>High_Pressure_Limit. If so, then:
at step 282, processor 70 sets Output_Freq=Max_Speed_Freq (e.g. 60 Hz);
at step 284 increments High_Pressure_Timer; and
at step 286, the processor determines if the High_Pressure_Timer>High_Time_Limit. If so, then at step 288, processor 70 sets the High_Pressure_Fault=True.

At step 290, the processor 70 determines if Pipe_Pressure/4<Low_Pressure_Limit. If so, then
at step 292, processor 70 sets Output_Freq=Max_Speed_Freq (e.g. 60 Hz)
at step 294, increments Low_Pressure_Timer; and at step 296, the processor 70 determines if the Low_Pressure_Timer>Low_Time_Limit. If so, then at step 298, processor 70 sets Low_Pressure_Fault=True.

At step 300, the processor determines whether requisite conditions are met to turn on the PID control, for example, power on, control switch 105 selected, start up not active, stop PID 174 not selected, Freq_Minus_Tgt_Freq<Min_Base_Freq, and output of commodity 21 not rapidly changing so as to induce a large control error. If so, then at step 302, processor 70 activates the PID control. After step 302, algorithm 200 continues at step 202.

Tuning for control model 74 parameters can be done by trial and error, or other known methods, for example, the Ziegler-Nichols closed loop method.

While the invention has been illustrated and described in detail in the foregoing drawings and description, the same is to be considered as illustrative and not restrictive in character, it being understood that only illustrative embodiments thereof have been show and described and that all changes and modifications that are within the scope of the claimed subject matter is desired to be protected.

The invention claimed is:

1. A pneumatic grain conveyance system for transporting grain from a grain dryer to a second piece of equipment, comprising:
   at least one transport pipe having a grain inlet comprising an airlock constructed and arranged to receive grain discharged from the grain dryer, the transport pipe including a sensor;
   a blower motor mounted to drive air through the at least one transport pipe;
   a variable speed motor drive electrically coupled to power the blower motor; and
   a processor and software operative to provide a blower motor speed control signal to the variable speed motor drive based on at least a first input corresponding to a reading from the sensor, a second input corresponding to a set point for the sensor reading, and a third input corresponding to a discharge rate of grain from the grain dryer, wherein the blower is thereby controlled to decrease the damage to the grain received from the grain dryer as the grain is transported through the transport pipe.

2. The system of claim 1, wherein the sensor comprises a pressure transducer for providing a pressure signal proportional to the pressure in the at least one transport pipe, and wherein the processor and software are operative to base the blower motor speed control signal at least in part on the magnitude of the pressure signal and a target pressure in the at least one transport pipe.

3. The system of claim 2, wherein the software includes selectable upper pressure limit and upper pressure timer limit, and the processor and software are operable to disable the blower motor and the grain dryer if the pressure signal exceeds the upper pressure limit for at least the upper time limit.

4. The system of claim 2, wherein the software includes a lower pressure limit and lower time limit, and the processor and software are operable to disable the blower motor and the first piece of equipment if the pressure signal recedes below the lower pressure limit for at least the lower time limit.

5. The system of claim 1, wherein the grain inlet includes an airlock and wherein the processor and software are operative to activate and deactivate the airlock.

6. The system of claim 5, further comprising an airlock motor associated with the airlock and at least a first switch controlled by the processor and software and operative to disable operation of the blower motor and the airlock motor.

7. The system of claim 6, further comprising at least a second switch controlled by the processor and software and connected to disable discharge of grain from the grain dryer into the at least one transport pipe.

8. The system of claim 1, wherein the processor and software determine the control signal in a feedback arrangement with respect to the first and second inputs and in a feedforward arrangement with respect to the third input.

9. The system of claim 1, further comprising a grain dryer controller, wherein the third input is received by the processor from the grain dryer controller.

10. The system of claim 9, in which the grain dryer has metering rolls and the third input corresponds to rotational speed of the metering rolls.

11. The system of claim 1, wherein the software includes a selected base speed associated with the blower motor, the base speed preventing overheating of the blower motor, and the processor and software are operative to limit the control signal based on the base speed.

12. The system of claim 1, wherein the software includes a selected starting set point, and the processor and software are operative to initially ramp up the control signal over time at least in part based on the starting set point.

13. The system of claim 1, further comprising a graphical user interface coupled to the processor and providing initiation, termination, and setting of parameters associated with the software.

14. A controller for a pneumatic grain conveyance system in which grain is conveyed in a transport pipe from a grain dryer to a second piece of equipment, the grain being driven by air pressure generated by a blower motor, the grain dryer discharge speed being controlled by a grain dryer controller, comprising:
   a variable speed motor drive electrically coupled to power the blower motor;
   a pressure transducer for providing a pressure signal proportional to the pressure in the transport pipe; and
   a processor, the processor having an input port for receiving the pressure signal, and software adapted to enable the processor to provide a control signal to the variable speed motor drive based at least in part on the magnitude of the pressure signal and a target pressure in the at least one transport pipe;
   wherein the processor includes an input port that receives a discharge speed signal from the grain dryer controller, and the processor and software are operative to determine the control signal based at least in part on the discharge speed signal, wherein the variable speed motor drive is thereby controlled to decrease the damage to the grain received from the grain dryer as the grain is transported through the transport pipe.

15. The system of claim 14, wherein the control signal may be determined by the software and processor based at least in part on a PID control model.

16. The system of claim 14, wherein the software includes a selectable upper pressure limit and an upper pressure time limit, and the processor and software are operable to disable the blower motor and the first piece of equipment if the pressure signal exceeds the selectable upper pressure limit for at least the upper pressure time limit.

17. The system of claim 14, wherein the software includes a lower pressure limit and a lower time limit, and the processor and software are operable to disable the blower motor and the first piece of equipment if the pressure signal recedes the lower pressure limit for at least the lower time limit.

18. A system for decreasing damage to dried grain during pneumatic transport from a grain dryer to a second piece of equipment, comprising:
- a grain dryer for generating dried grain;
- a transport pipe comprising an airlock configured to receive the dried grain and deliver it to a second piece of equipment;
- a blower motor having a variable speed drive configured to drive air through the transport pipe; and
- a controller operative to control the speed of the blower motor based on at least a first input corresponding to a reading from at least one sensor, a second input corresponding to a set point for the sensor reading, and a third input corresponding to the rate at which grain is entering the transport pipe to thereby decrease the damage to the dried grain as it is conveyed through the transport pipe.

19. The system of claim 18 in which the controller operates in a feedback arrangement with respect to the first and second inputs and in a feedforward arrangement with respect to the third input.

20. The system of claim 19 in which the at least one sensor is a pressure transducer and the second input is a pressure set point.

\* \* \* \* \*